Figure 7:
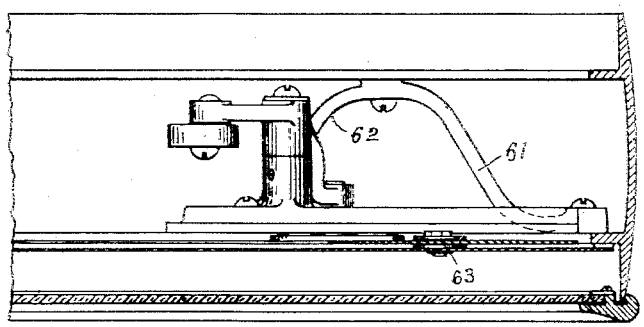

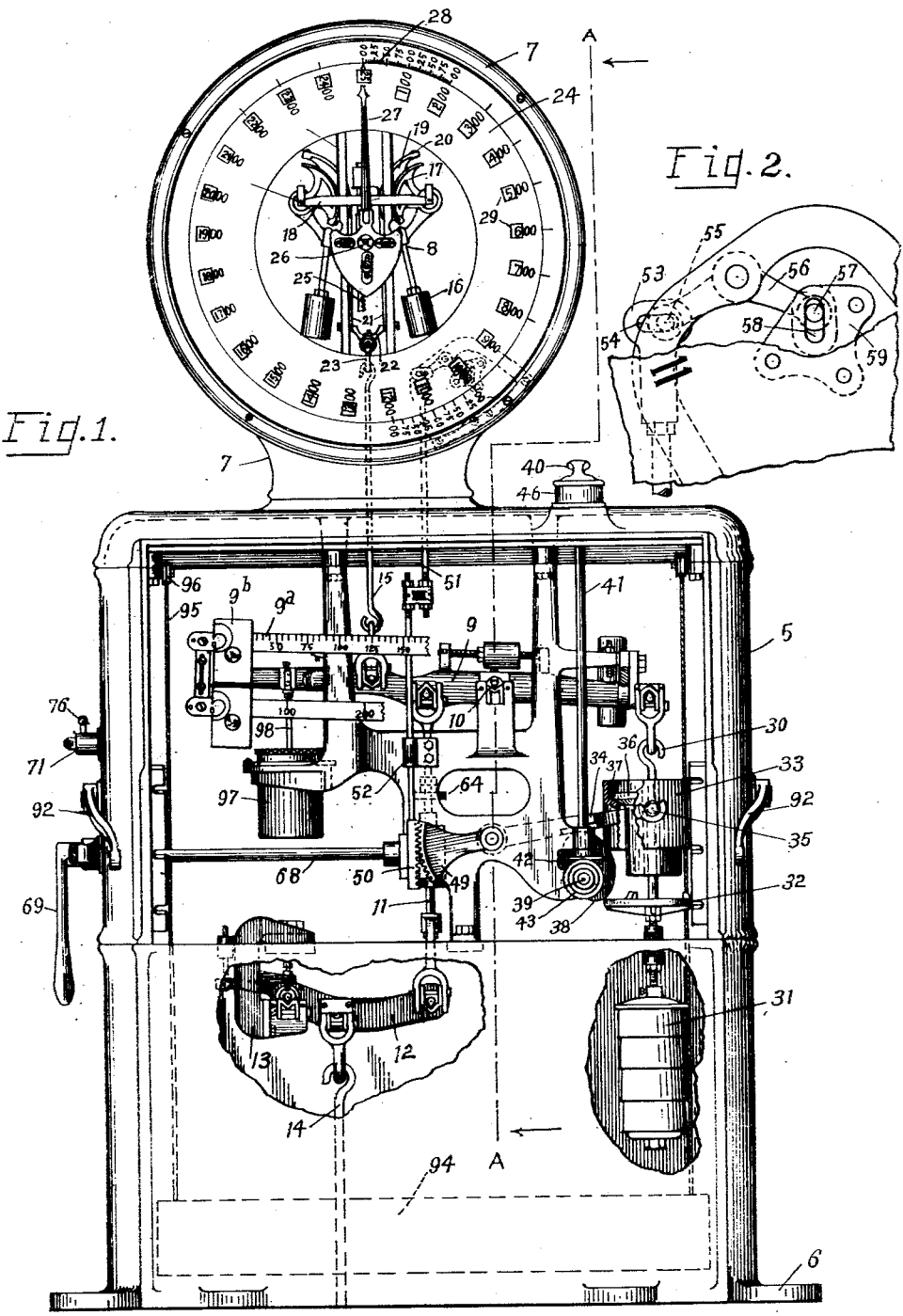

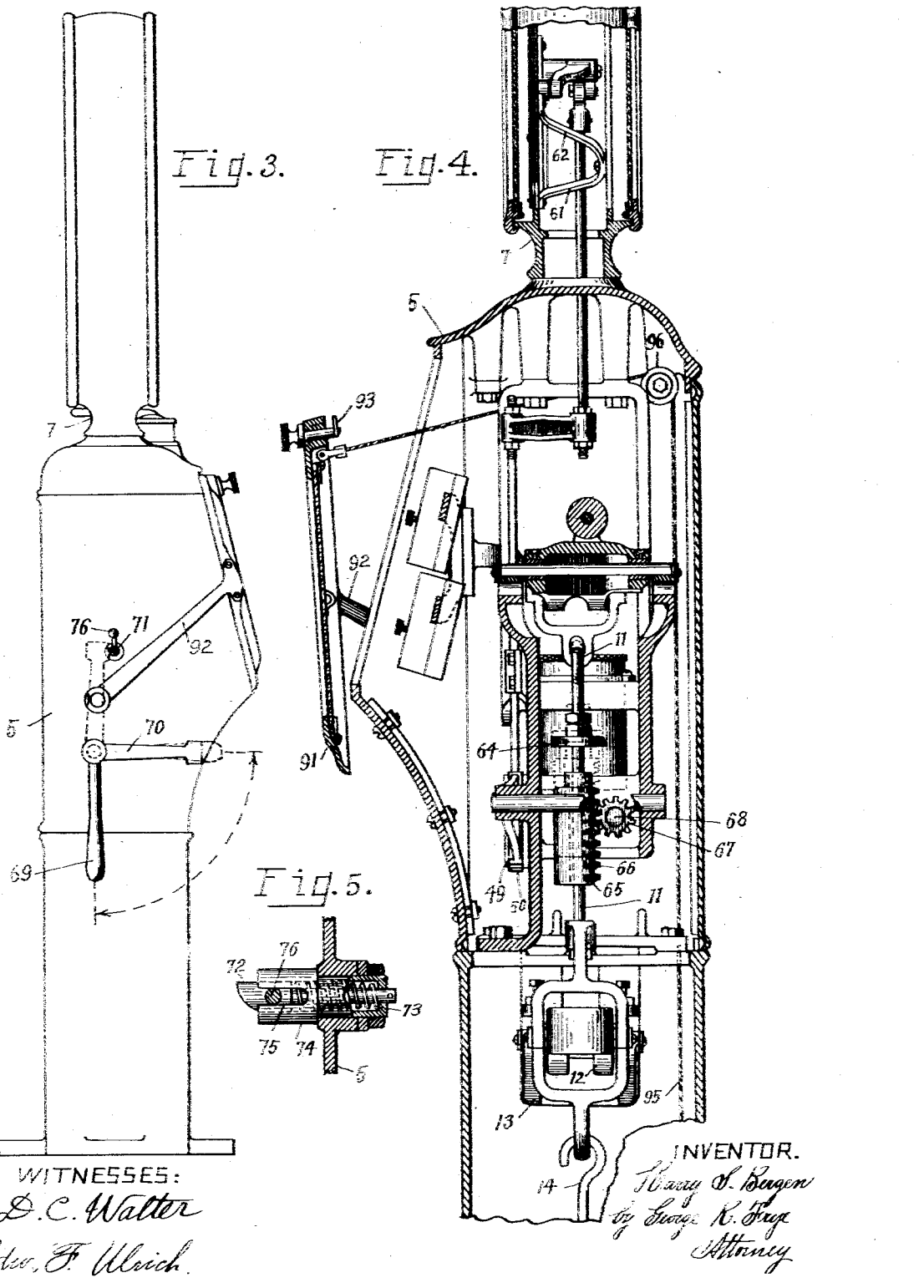

Jan. 23, 1923.
H. S. BERGEN.
WEIGHING SCALE.
FILED MAY 10, 1916.
1,443,163.
4 SHEETS—SHEET 4.
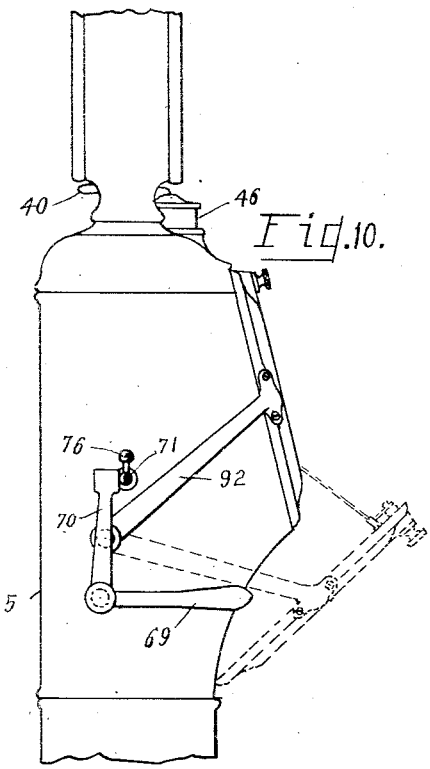
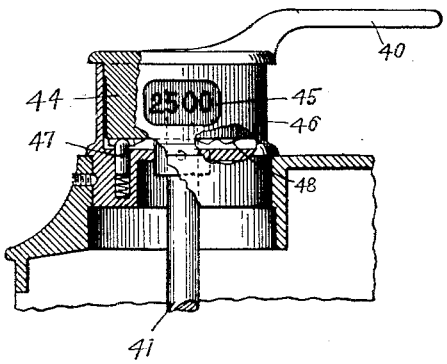
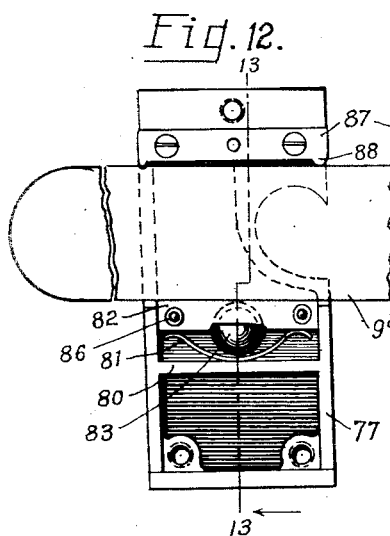
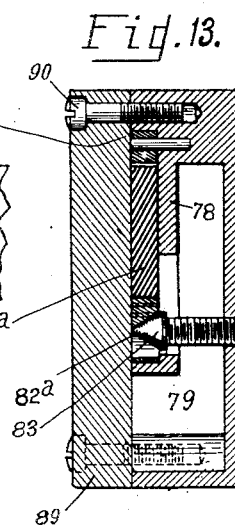
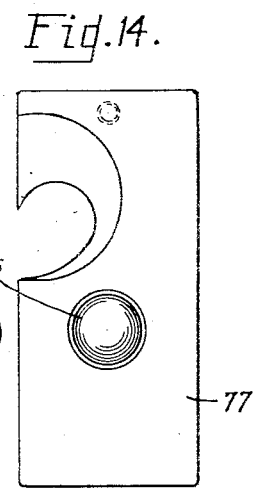
WITNESSES:
D. C. Walter
Edw. F. Ulrich
INVENTOR.
Harry S. Bergen
by George R. Frye
Attorney Patented Jan. 23, 1923.

1,443,163

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed May 10, 1916. Serial No. 96,512.

*To all whom it may concern:*

Be it known that I, HARRY S. BERGEN, a citizen of the United States, residing at Toledo, in the county of Lucas and State of Ohio, have invented certain new and useful Improvements in Weighing Scales, of which the following is a specification.

My invention relates to weighing scales designed to weigh comparatively heavy loads, and more particularly to the type of automatic or semi-automatic scales, though it will be understood that in many or all of its features the invention is applicable to other types of scales. In scales of the type herein illustrated, it is desirable to suitably connect upon a platform-supporting lever mechanism a scale beam arranged to carry one or more tare and capacity beams or detachable counterpoise weights, and in addition to connect a pendulum counter-balance mechanism with the scale beam so that both the pendulum counterbalance mechanism and the beam weighing mechanism will be operated from the single set of platform levers. A weighing machine of this kind, therefore, combines two systems of weighing, the one system providing for the use of a pendulum counterbalance mechanism automatically indicating on a dial the weight of the load offset thereby, and the other system providing for the use of counterpoise weights co-acting with the scale beam in the usual manner of that type of scales known as beam scales, and the two systems are so connected that the addition of counterpoise weights upon the scale beam will be shown upon the same dial which indicates the weight offset by the pendulum mechanism. The load-offsetting mechanism comprises both the automatic or pendulum mechanism and the non-automatic or beam scale mechanism, but the weight of the load offset may be indicated upon a single dial so that the operator can readily determine the weight of loads upon the scale platform.

This invention particularly has in view the provision of improved means for constructing, arranging and combining various elements and details of the scale mechanism, as for example, the provision of improved means for suspending detachable counterpoise weights; for depositing them successively upon the scale beam, as desired; for simultaneously altering the indications upon the dial of the scale in accordance with the amount of weight offset thereby; the adaptation of an improved means for relieving the knife edges, pendulum mechanism, and other delicate parts of the scale from shock as loads are placed upon the scale platform; and the provision of an improved form of slidable poise for co-action with the tare and capacity beams.

Other objects and features of the invention will readily appear from the following description and claims, in which reference is had to the accompanying drawings illustrating a preferred embodiment of my invention and wherein similar reference numerals designate similar parts throughout the several views.

In the drawings:—

Figure 6:
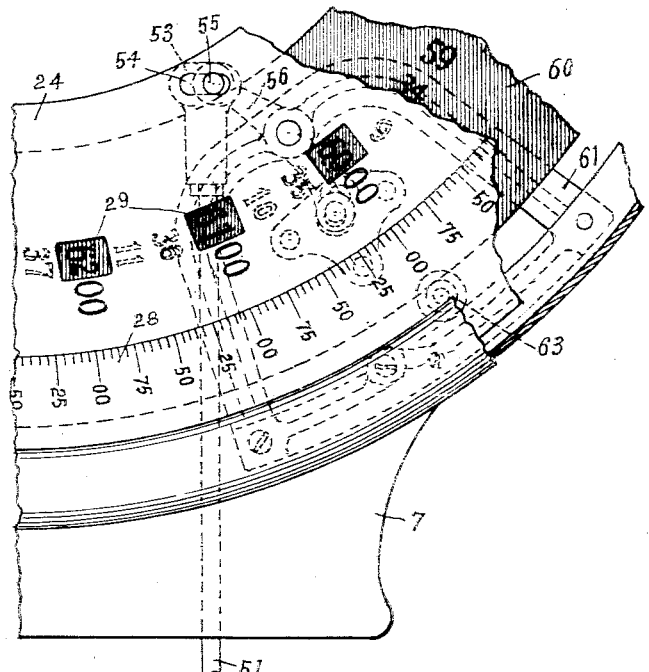
Figure 8:
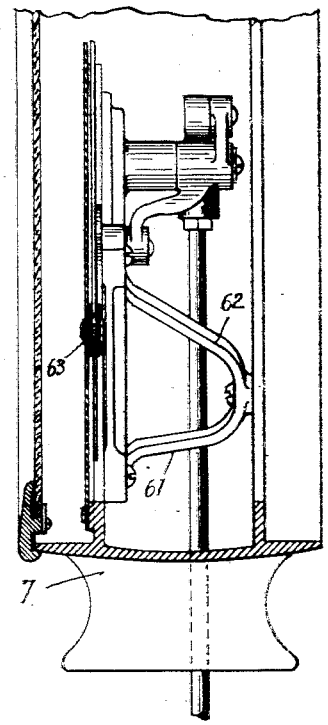
Figure 9:
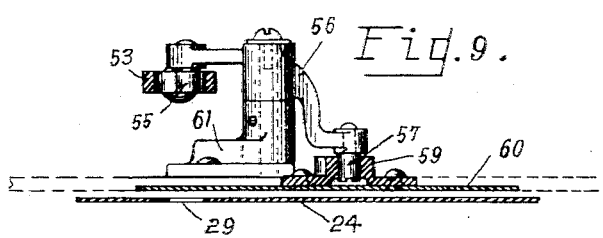

Fig. 1 is a front elevation, with parts broken away, of my improved scale in position to be connected with the platform-supporting levers; Fig. 2 is an enlarged detail view of a portion of the adjustable dial operating means; Fig. 3 is a side elevation; Fig. 4 is a transverse section taken substantially on the line A—A of Fig. 1; Fig. 5 is a detail elevation with parts in section of the latch for holding the locking lever; Fig. 6 is an enlarged detail view of a portion of the dial and the mechanism for shifting same; Figs. 7 and 8 are plan view and side elevation respectively of the elements shown in Fig. 5; Fig. 9 is a detail sectional view therethrough; Fig. 10 is a side elevation of the upper portion of the scale casing; Fig. 11 is a detail sectional view with parts in elevation showing the upper portion of the weight-depositing mechanism and the auxiliary indicating means carried thereby; Fig. 12 is a rear elevation of the slidable poise utilized, with the back plate thereof removed; Fig. 13 is a transverse sectional view through the poise; and Fig. 14 is a front elevation thereof.

The casing 5 of the scale is adapted to be secured upon the usual base (not shown) adjacent one end thereof, lugs 6 being herein shown for suitably securing the casing thereto, though other securing means may be employed. The housing 7 is supported upon the upper end of the casing 5 and contains the pendulum counterbalance mechanism 8. The scale beam 9 is fulcrumed, as at 10, within the casing 5 and is suitably connected, as by the adjustable link 11, with a bench lever 12 suitably fulcrumed upon brackets 13 carried by the casing 5, the lever 12 being suitably connected, as by the steelyard rod 14, with the platform-supporting lever mechanism (not shown). It is to be understood that any suitable platform lever mechanism may be employed in connection with my improved scale, the mechanism herein shown being adapted to co-act with various forms of scales utilizing various types of platform lever mechanisms.

The scale beam 9 is also connected, as by the hook rod 15, with the pendulum counterbalance mechanism 8 which is shown merely by way of exemplification, it being understood that the pendulum counterbalance mechanism forms no part of the present invention. The particular pendulum counterbalance herein illustrated (Fig.1) is one that has been found to successfully demonstrate the capabilities of this invention, and shows a double pendulum scale of a well-known type adapted to be suitably connected with the scale beam 9 through the medium of the hook rod 15 and so arranged and positioned that upon the placing of a load upon the scale platform, the pendulums will be swung upwardly into a position counterbalancing the weight of the load on the platform. As herein shown, the pendulum counterbalance mechanism comprises a pair of oppositely-disposed pendulums 16, each of which comprises supporting segments 17 secured on transverse shafts and the two shafts are connected together by cross-bars 18, the segments 17 being suitably suspended upon the lower ends of flexible supporting ribbons secured at their upper ends upon the framework of the scale. Intermediate the supporting segments of each pendulum is a somewhat larger segment 19, which is also fixed to the transverse shaft, said segment extending at its periphery between the pillars of the framework supporting the segments 17 and is connected at its upper end, as at 20, to a flexible metallic ribbon 21 which extends over the arcuate face of the segment and is attached at its lower end to an equalizer bar 22. The construction of the two pendulums is substantially identical, and the ribbons 21, as shown in Fig. 1, are connected to opposite sides of the equalizer bar 22, which is pivotally connected, as by the link 23, with the upper end of the hook rod 15, which, as before described, is connected with the scale beam 9.

In the operation of the scale, when a load is placed on the scale platform, a downward pull is exerted upon the equalizer 22, which is transmitted through the ribbons 21 to the larger segments 19, causing the swinging of the pendulums so that the pendulum weights are raised to a counterbalancing position. During the swinging movement of the pendulums to offset the weight of the load, the crossbars 18 are moved vertically upward, and through the medium of this vertical movement of the crossbars the weight indication on the dial 24 is effected, the crossbars 18 carrying a vertically-disposed rack 25 meshing with a pinion (not shown) fixed upon the indicator shaft 26 carrying the index hand 27. The indicator shaft 26 is mounted concentrically of the dial 24, which dial bears suitable radially-disposed indicating marks or graduations 28 thereon (Figs. 1 and 6), with which graduations the index hand 27 co-operates in indicating the weight of the load being weighed. This pendulum counterbalance mechanism is sufficient to independently offset the weight of all loads within the normal capacity shown on the dial. When loads are placed on the scale platform exceeding this normal capacity of the pendulum mechanism, the additional weight may be counterbalanced by the detachable counterpoise weights adapted to co-act with the scale beam 9, in the manner presently to be described, and the movement of such counterpoise weights into weighing position upon the scale beam 9 will serve to actuate the dial shifting mechanism to change the designating figures marking the graduations of the dial.

The scale beam 9 carries a hanging counterpoise-receiving member 30 suitably suspended from one of the beam pivots, which member may carry a hanging weight 31 of sufficient weight to assist in the floating of the platform and lever mechanism in the usual manner. A counterpoise pan 32 is arranged in position to serially receive the detachable counterpoise weights 33 normally suspended above the counterpoise pan upon a suitable supporting lever 34, which is preferably pivotally mounted upon brackets carried by the casing 5 substantially as shown in Fig. 1. The detachable weights 33 are preferably constructed as a series of hollow tubular members of varying diameters, the outermost weight 33 being provided with trunnions 35 adapted to rest in cup bearings formed in the bifurcated arms of the supporting lever 34 (Fig. 1), and the inner weights being of lesser diameters nested within the outermost weight so as to be normally suspended therefrom. The lower extremity of the outermost weight 33 is normally furthest removed from the counterpoise pan 32 and the lower extremities of the inner weights are so positioned that they normally are located nearer to the counterpoise pan as they approach the center of the series of nested weights. In other words, the central weight of the series of nested weights is of sufficient length to extend comparatively close to the normal position of the counterpoise pan 32, and the remaining weights being progressively spaced further therefrom sufficient distance being maintained, however, between the counterpoise pan and the lower extremity of the central weight to allow the full movement of the counterpoise pan as the beam rocks in its load-offsetting capacity without touching the central detachable weight 33. The central weight 33 is directly suspended from the next surrounding weight of the series, being preferably constructed with a flanged head 36 having an inclined lower surface adapted to rest upon the inclined upper surface of an internal annular rib 37 formed in the surrounding weight. In the illustrated embodiment, only two nested weights 33 are shown, but it is to be understood that as many surrounding weights may be nested and suspended from each other as is desired for the capacity of the scale utilized. In increasing the number of suspended weights 33, the weight immediately surrounding the central weight would be provided with a flanged head adapted to rest upon the internal annular rib of the next surrounding weight of the series, which weight may be likewise provided with a flanged head for engagement with the internal annular rib of the next surrounding series, and so on, the outermost of the series of weights being provided with trunnions 35 fitting in the cup bearings on the supporting lever 34.

The supporting lever 34 is normally maintained in a raised position by means of a cam 38 fixed on a transverse shaft 39 (Fig. 1), the periphery of the cam engaging the lever and forcing the arm of the lever 34 carrying the nested weights 33 into the raised position shown in Fig. 1. The cam 38 is rotated to lower the lever 34 to serially deposit the weights 33 upon the counterpoise pan 32 as follows. A hand lever 40 is mounted on the upper end of a vertical shaft 41 and is preferably positioned at the top of the casing 5 adjacent the dial of the scale. The lower extremity of the shaft 41 carries the bevel gear 42 which meshes with the bevel gear 43 on the shaft 39 carrying the cam 38. Rotative movement of the hand lever 40 will thus be imparted to the cam 38 to swing the same to a position wherein a portion of the cam of lesser radius is in contact with the lever 34, the weight of the nested detachable weights 33 carrying this arm of the lever 34 downwardly as the cam rotates. Therefore, to deposit one of the nested weights 33 upon the counterpoise pan 32, the hand lever is given a partial rotation sufficient to rotate the cam 38 to allow the lever 34 to drop far enough to bring the lower extremity of the central weight 33 into engagement with the pan 32 and to then carry the remaining nested weights a little distance below to free the flanged head of the central weight from engagement with the annular rib of the next surrounding weight. A further rotation of the hand lever 40 will serve to rotate the cam to allow the lever 34 to drop sufficiently to bring the lowermost extremity of the next weight into engagement with the pan 32, and so on. To indicate to the operator how far to turn the hand lever 40, I preferably provide a disk 44 on the shaft 41 immediately below the hand lever 40, the periphery of this disk bearing numerals indicating the load-offsetting capacity of the several weights of the series, these numerals being progressively spaced around the periphery and becoming visible through a sight opening 45 in the guide sleeve 46 (Fig. 11) as the hand lever is rotated. Thus, if the load-offsetting capacity of the central weight of the series equals 2500 lbs., the hand lever 40 would be rotated until the numeral 2500 appeared opposite the sight opening 45, whereupon the operator would know that the hand lever had been rotated a sufficient distance to deposit the central weight on the counterpoise pan. A spring-pressed latch 47 is preferably arranged in the sleeve 46 to co-act with projections 48 on the base of the disk 44 to aid in retaining the disk in any adjusted position. The rocking of the supporting lever 34 in its weight-depositing function is also utilized to shift the designating portions of the indications upon the dial 24 in accordance with the changes effected in the counterbalancing capacity of the scale mechanism, due to the depositing of the detachable weights 33 on the counterpoise pan. As herein illustrated, the arm of the lever 34 opposite to that supporting the detachable weights 33 is formed with a toothed segment 49 meshing with a vertically-disposed rack 50 carried by the adjustable link 51, which is guided for vertical movement in tubular brackets 52 mounted in the casing 5 (Fig. 1).

The link 51 terminates in a slotted head 53, the slot 54 therein receiving the wrist pin 55 carried by the arm of the rocking lever 56, the other arm of which carries a wrist pin 57 movable in the slot 58 in the bracket 59 secured on the rear face of the ring 60 (Fig. 9), the walls of the slot 58 being arranged at an angle to the arc of travel of the pin 57 so that the rocking of the lever 56 will impart a slight rotative movement to the ring 60. The ring 60 bears a series of circumferentially-spaced numerals on the front face thereof in position to align with the sight openings 29 in the dial 24, these numerals being arranged so that successive numerals from 1 to the designating numeral denoting the present capacity of the chart are circumferentially spaced from each other a distance corresponding to the circumferential spacing of the sight openings 29 in the dial, whereby the successive numerals appear through successive sight openings around the dial when the ring 60 is in one of its adjusted positions. A second circumferential series of designating numerals are spaced similarly around the ring 60 beginning with the next numeral following that designating the former capacity of the chart and running successively to and ending with a number double that of the first capacity, each of the numerals in the second series being circumferentially spaced a short distance from the numerals of the first series whereby all of the numerals of the second series will appear through the sight openings 29 of the dial when the ring 60 is in its second adjusted position. A third series of numerals may be similarly spaced around the ring 60, if desired, this third series beginning with the next number following the highest numeral on the second series of designating numerals and running to and ending with a numeral trebling that of the highest numeral in the first series of numerals, and a fourth series may be added, or even more, as desired, the numerals in each of the several series being spaced from each other a distance corresponding to the spacing of the sight openings 29 in each adjusted position of the ring 60. The movement of the rocking lever 56 is proportional to the movements of the lever 34 supporting the series of counterpoise weights 33 so that the position of the ring 60 is automatically changed as one or more of the weights 33 are deposited on or removed from the counterpoise pan 32. In the illustrated embodiment, the first capacity of the chart is 2500 lbs. corresponding to the counterbalancing capacity of the pendlum mechanism, and the designating numerals in the first series of numerals on the ring 60 run from 1-25. The counterbalancing capacity of each of the weights 33 is also 2500 lbs., so that when one of said weights is deposited on the pan 32 the second series of designating numerals on the ring 60 is brought into alignment with the sight openings 29, this second series beginning at the numeral 26 and ending with the numeral 50. If a second detachable weight 33 is deposited on the pan 32, the ring 60 is adjusted to bring a third series of numerals into alignment with the sight openings 29 on the dial, this third series beginning with the numeral 51 and ending with the numeral 75. The terminal figures of the indications on the dial, of course, remain the same, so that the changing of the designating numerals by the shifting of the ring 60 serves to change the reading of the indications upon the dial.

The rocking lever 56 is pivotally mounted on a bracket 61 secured upon the framework of the housing 7, this bracket being preferably constructed substantially as shown in Figs. 6-8 with a body portion attached to the forward portion of the housing 7 and a brace 62 attached to the rear portion of the housing. The ring 60 is preferably mounted upon flanged guide rollers 63 (Figs. 6 and 8) circumferentially spaced around the periphery of the ring.

In order to save the knife edges, pendulum mechanism, and other delicate parts of the scale from injury and unnecessary wear during the placing of a load upon the scale platform, it is desirable that the scale beam 9 and pendulum mechanism be disconnected from the platform supporting lever mechanism to prevent the transmission of shocks thereto, and further that the locking device can be operated without opening the door of the casing 5. To effect this result, I secure a collar 64 upon the adjustable link 11 substantially as shown in Fig. 4, and mount a vertically-movable sleeve 65 around said hook rod with its upper extremity normally spaced a short distance from the collar 64. The sleeve 65 is preferably provided with a rack 66 meshing with a pinion 67 fixed on one end of the shaft 68, the other end of said shaft extending through a bearing in the side of the casing 5 and having fixed thereto a hand lever 69 formed with a locking arm 70 (Fig. 3). By rotating the hand lever 69 from the full line position shown in Fig. 3 to the dotted line position shown therein, the pinion 67 is rotated to elevate the sleeve 65 into contact with the collar 64, and then a short distance further to lift the adjustable link 11 and the elements attached thereto to substantially the position shown in dotted lines in Fig. 4, thereby removing the upper end of the adjustable link 11 from engagement with the scale beam 9 and lifting the bench lever 12 and steelyard 14 to slightly elevate the platform-supporting lever mechanism secured to the lower extremity of the steelyard. When the scale beam 9 is disconnected from the adjustable link 11 as above described, the suspended weight 31 will pull the arm of the scale beam attached thereto downwardly, thereby elevating the other arm of the scale beam so as to swing the beam pivots secured in the other arm upwardly, removing one of the pivots from engagement with the stirrup forming a part of the connection to the pendulum mechanism, which allows the pendulums 16 to fall into engagement with the bumpers on the framework of the housing 7. When the hand lever 69 has been swung into its upper position disconnecting the platform-supporting mechanism from the scale beam and pendulum mechanism, this lever is locked in its raised position by means of a spring-pressed latch 71 (Figs. 3 and 5). As herein illustrated, the latch 71 comprises a plunger 72 having an inclined outer surface substantially as shown in Fig. 5 and normally pressed into an extended position by means of the coil spring 73, the plunger and spring being enclosed within a hollow guide 74 secured in the side wall of the casing 5, a slot 75 being formed in the guide 74 for the reception of a knob 76. As the hand lever 69 is rocked upwardly, the arm 70 thereof is thrown into engagement with the inclined face of the plunger 72 forcing the plunger inwardly against the tension of the spring 73 to allow the arm to pass the plunger, the spring 73 then returning the plunger to its extended position, whereupon the forward face of the arm 70 will contact with the rear face of the plunger 72, locking the arm and the hand lever attached thereto in raised position. To release the hand lever to allow it to be swung to its lower position, the knob 76 is grasped by the operator and the plunger 72 moved inwardly to free the edge of the arm, the hand lever being then rocked as desired.

The scale beam 9 may carry one or more graduated tare or capacity beams 9ª provided with slidable poises 9ᵇ in the customary manner. However, the construction of the slidable poises 9ᵇ herein illustrated is novel. The poise preferably comprises a hollow front plate 77 shaped substantially as shown in Figs. 12–14 with a guide wall 78 adapted to approach closely the front face of the tare beam 9ª, and a cavity 79 for receiving a filler of lead, etc., for suitably weighting the poise. The crossbar 80 (Fig. 12) is also formed on the front plate 77 and supports a light spring 81 adapted normally to lightly press a friction plate 82 against the lower edge of the tare beam 9ª. The friction plate 82 is also provided with an inclined portion 82ª co-operating with the cone-shaped end of the wedging or locking screw 84, which is threaded into the wall of the front plate 77 and provided with a knurled knob. Suitable bearings 86 may be mounted within the friction plate 82 to guide the same in its vertical movements, if desired. An anti-friction guide plate 87 is secured substantially as shown in Figs. 12 and 13, said plate being provided with a pair of rounded feet 88 adapted to rest upon the upper edge of the tare beam 9ª. A rear plate 89 is secured to the front plate 77 by screws or other suitable fastening means 90.

Ready access to the slidable poises of the tare or capacity beams 9ª may be had through an opening in the front of the casing 5 (Fig. 4), this opening being normally covered by a door 91 pivotally connected with the casing 5 by means of supporting links 92. The links 92 are preferably arranged on opposite sides of the casing 5 as shown in Fig. 1, and the door is provided with suitable latching means 93 (Fig. 4) to retain same in closed position. To facilitate the opening and closing of the door 91, a counterbalance weight 94 (Fig. 1) is connected by means of a pair of flexible cables 95 with the upper portion of the door (Fig. 3), the flexible cables passing over suitable pulleys 96 mounted in the casing.

The operation of the scale is believed to be apparent from the foregoing description. A load being placed upon the scale platform will depress the scale beam 9 through the medium of the platform-supporting levers, steelyard 14, bench lever 12 and adjustable link 11 the depression of the scale beam 9 serving to elevate the pendulums 16 of the pendulum counterbalance mechanism through the pull exterted upon the hook rod 15, as hereinbefore described. The raising of the pendulums 16 will serve to counterbalance the weight of a load within the capacity of the pendulum counterbalance mechanism. When the weight of the load placed upon the platform exceeds the capacity of the pendulum counterbalance mechanism, a portion of this weight may be offset by depositing one or more of the detachable counterpoise weights 33 upon the hanging counterpoise pan 32 carried by the scale beam by rotating the hand lever 40 to operate the weight-depositing mechanism, or by sliding one or more of the poises 9ᵇ along the tare or capacity beam carried by the scale beam, and the remaining portion of the weight of the load may be offset by the pendulum counterbalance mechanism.

To dampen the movement of and effectively prevent vibration of the scale beam 9 and pendulum counterbalance mechanism, a dash pot 97 may be provided. As herein shown, the dash pot comprises a cylinder suitably supported upon a bracket carried by the casing 5 and adapted to contain glycerine, oil, or other liquid, the plunger of the dash pot being connected with the scale beam 9 by means of the stem 98 (see Fig. 1).

While it will be apparent from the foregoing description that the illustrated embodiment herein disclosed is well calculated to adequately fulfill the objects of the invention as primarily stated, it is to be understood that my invention is susceptible to modification, variation and change without departing from the spirit and scope of the invention as set forth in the subjoined claims.

Having described my invention, I claim:

1. In a scale, a scale beam, a counterpoise receiving pan suspended therefrom, a series of nested counterpoise weights suspended one from another above the pan, a lever for supporting the outermost of said weights, and movable means contacting said lever and normally holding said lever in raised position.

2. In a scale, a scale beam, a counterpoise receiving pan suspended therefrom, a series of nested counterpoise weights suspended one within another above the pan, a lever for supporting the outermost of said weights, and rotatable means contacting said lever and normally holding said lever in raised position.

3. In a scale, a scale beam, a counterpoise receiving pan suspended therefrom, a series of nested counterpoise weights suspended one within another above the pan, a lever for supporting the outermost of said weights, a rotatable cam contacting said lever and normally holding said lever in raised position.

4. In a scale, a casing, a scale beam within the casing, a counterpoise receiving pan suspended therefrom, a series of nested counterpoise weights suspended one within another above the pan, a lever for supporting the outermost of said weights, a rotatable cam contacting said lever and normally holding said lever in raised position, and means for rotating the cam including a hand lever outside the casing.

5. In a scale, a casing, a scale beam within the casing, a counterpoise receiving pan suspended therefrom, a series of nested counterpoise weights suspended one within another above the pan, a lever for supporting the outermost of said weights, a rotatable cam contacting said lever and normally holding said lever in raised position, means for rotating the cam including a hand lever outside the casing, and means adjacent the hand lever for indicating the load-offsetting capacity of the weights transferred to the counterpoise pan.

6. In a scale, a casing, a scale beam within the casing, a counterpoise receiving pan suspended therefrom, a series of nested counterpoise weights suspended one within another above the pan, a lever for supporting the outermost of said weights, a rotatable cam contacting said lever and normally holding said lever in raised position, means for rotating the cam including a rotatable hand lever mounted outside the casing, and a drum carried by the hand lever and bearing weight indications corresponding to the load-offsetting capacities of the weights transferred to the counterpoise pan.

7. In a scale, a scale beam, a counterpoise receiving pan suspended therefrom, a series of nested counterpoise weights suspended one within another above the pan, a lever for supporting the outermost of said weights, a rotatable cam contacting said lever and normally holding said lever in raised position, means for rotating said cam to lower said lever, and means for indicating the load-offsetting capacity of the weights transferred to the counterpoise pan.

8. In a scale, a dial having a series of circumferentially-spaced openings therein, a disc rotatably mounted behind said dial and bearing series of numerals, a scale beam, a counterpoise pan suspended therefrom, a series of counterpoise weights suspended one from another above said pan, a lever supporting the outermost weight of the series, movable means for normally holding said lever in raised position, and a link connecting said lever with said rotatable disc whereby the disc will be rotated in accordance with the movements of said lever.

9. In a scale, a dial having a series of circumferentially-spaced openings therein, a disc rotatably mounted behind said dial and bearing series of numerals, a scale beam, a counterpoise pan suspended therefrom, a series of nested counterpoise weights suspended one within another above the pan, a lever supporting the outermost weight of the series, movable means for normally holding said lever in raised position, and a link connecting said lever with said rotatable disc whereby the disc will be rotated in accordance with the movements of said lever.

10. In a scale, a dial having a series of circumferentially-spaced openings therein, a disc rotatably mounted behind said dial and bearing series of numerals, a scale beam, a counterpoise pan suspended therefrom, a series of counterpoise weights suspended one from another above said pan, a lever having one arm supporting the outermost weight of the series, the other arm thereof bearing rack teeth, movable means for normally holding said lever in raised position, and a link connecting said lever with said rotatable disc whereby the disc will be rotated in accordance with the movements of said lever.

11. In a scale, a dial having a series of circumferentially-spaced openings therein, a disc rotatably mounted behind said dial and bearing series of numerals, a scale beam, a counterpoise pan suspended therefrom, a series of counterpoise weights suspended one from another above said pan, a lever supporting the outermost weight of the series, movable means for normally holding said lever in raised position, and a link connecting said lever with said rotatable disc whereby the disc will be rotated in accordance with the movements of said lever.

12. In a scale, a dial having a series of circumferentially-spaced openings therein, a disc rotatably mounted behind said dial and bearing series of numerals, a scale beam, a counterpoise pan suspended therefrom, a series of counterpoise weights suspended one from another above said pan, a lever having one arm supporting the outermost weight of the series, the other arm thereof carrying a segmental rack, movable means for normally holding said lever in raised position, and a link connecting said lever with said rotatable disc whereby the disc will be rotated in accordance with the movements of said lever.

13. In a scale, a scale beam, a counterpoise receiving pan suspended therefrom, a series of counterpoise weights suspended above said pan, a lever from which the series of weights is suspended, rotatable means normally maintaining the lever in raised position, a dial bearing weight graduations thereon and having a circumferentially-spaced series of openings therein, a disc rotatably mounted behind said dial and bearing series of weight numerals, and means for rotating said disc in conformity with the movements of the lever supporting said series of weights, comprising a bracket on said disc, a link connected with the lever, and a rocking lever interposed between said link and said bracket.

14. In a scale, a scale beam, a counterpoise receiving pan suspended therefrom, a series of counterpoised weights suspended above said pan, a lever from which the series of weights is suspended, rotatable means normally maintaining the lever in raised position, a dial bearing weight graduations thereon and having a circumferentially-spaced series of openings therein, a disc rotatably mounted behind said dial and bearing series of weight numerals, and means for rotating said disc in conformity with the movements of the lever supporting said series of weights, comprising a bracket on the disc having a slot therein, a link connected with the lever and having a slot therein adjacent its upper extremity, and a rocking lever having pins movable in the slots in said bracket and link respectively.

15. In a scale, a scale beam, a counterpoise receiving pan suspended therefrom, a series of counterpoise weights suspended above said pan, a lever from which the series of weights is suspended, rotatable means normally maintaining the lever in raised position, a dial bearing weight graduations thereon and having a circumferentially-spaced series of openings therein, a disc rotatably mounted behind said dial, and bearing series of weight numerals, and means for rotating said disc in conformity with the movements of the lever supporting said series of weights, comprising a bracket on the disc having a slot therein, a link connected with the lever and having a slot thereon adjacent its upper extremity, and a rocking lever pivoted intermediate its ends, and carrying wrist pins adjacent its opposite ends engaging the slots in said bracket and link respectively.

16. In a scale, a dial having weight graduations thereon and a series of circumferentially-spaced openings therein, a rotatable disc mounted behind the dial and bearing weight numerals, means for rotating said disc, and means for guiding said disc in its rotating movements including a plurality of rotatable bearings circumferentially-spaced from each other and mounted adjacent the periphery of the disc, the peripheral edge of the disc contacting with the peripheral faces of said bearings.

17. In a scale, a dial having weight graduations thereon and a series of circumferentially-spaced openings therein, a rotatable disc mounted behind the dial and bearing weight numerals, means for rotating said disc, and means for guiding said disc in its rotating movements including a plurality of grooved pulleys circumferentially-spaced from each other and mounted adjacent the periphery of the disc, the peripheral edge of the disc contacting with the peripheral face of the groove in each pulley.

18. In a scale, a scale beam having pivots therein, a pendulum weighing mechanism normally connected therewith, means for connecting the scale beam with a goods-receiver, including a link carrying bearings engaging pivots on the scale beam, and means for locking the scale beam and pendulum mechanism in inoperative position comprising a rock shaft mounted adjacent the beam, a pinion fixed on said shaft, a sleeve surrounding said link and carrying a rack meshing with said pinion, a stop member fixed on said link above the normal position of the sleeve, and means for rotating the shaft and pinion whereby the sleeve will contact with said stop member to lift the bearings from the pivots of the scale beam.

19. In a scale, a scale beam having pivots therein, a pendulum weighing mechanism normally connected therewith, means for connecting the scale beam with a goods-receiver, including a link carrying bearings engaging pivots on the scale beam, and means for locking the scale beam and pendulum mechanism in inoperative position comprising a rock shaft mounted adjacent the beam, a pinion fixed on said shaft, a sleeve surrounding said link and carrying a rack meshing with said pinion, a stop member fixed on said link above the normal position of the sleeve, and means for rotating the shaft and pinion whereby the sleeve will contact with said stop member to lift the bearings from the pivots of the scale beam, and means for latching the shaft rotating means comprising a spring-pressed latch and an arm on said shaft adapted to be contacted by said latch when in raised position.

20. In a scale, a circular dial having graduations marked thereon and a series of circumferentially-spaced openings adjacent the graduations, a disc rotatably mounted on peripheral bearings and having a series of numerals arranged to be selectively displayed through the openings in the dial, a capacity-increasing device, and means operated by said capacity-increasing device to partially rotate said disc.

21. In a scale, a circular dial having graduations marked thereon and a series of circumferentially-spaced openings adjacent the graduations, a disc rotatably mounted on peripheral bearings and having a series of numerals arranged to be selectively displayed through the openings in the dial, said dial and disc having registering windows at their centers, a capacity-increasing device, and means operated by said capacity-increasing device to partially rotate said disc.

22. In a scale, a scale beam, a counterpoise-receiving pan suspended therefrom, a series of nested counterpoise weights suspended one within another above the pan, a lever for supporting the outermost of said weights, a rotatable cam contacting said lever and normally holding it in raised position capable of being turned to transfer said weights successively to said pan, said lever carrying a toothed sector, a rack engaging said sector, and means operated by said rack to indicate the load-offsetting capacity of the weights.

HARRY S. BERGEN.

Witnesses:
  KARL E. HAYES,
  ORWELL C. REEVES.